United States Patent Office 3,647,856
Patented Mar. 7, 1972

3,647,856
SULFINYL YLIDS
Alden Dwayne Josey, New Castle County, Del., assignor to E. I. du Pont de Nemours and Company, Wilmington, Del.
No Drawing. Filed Dec. 8, 1967, Ser. No. 688,958
Int. Cl. C07c *145/00*
U.S. Cl. 260—465 U          7 Claims

ABSTRACT OF THE DISCLOSURE

Sulfinyl ylids which are useful as acid scavengers having the formula $$R-\overset{O}{\underset{|}{S}}-Z=PR'_3$$

in which R and R' are hydrocarbon groups or hydrocarbon groups with inert substituents and Z is nitrogen or carbon joined to an electron withdrawing group can be made by reacting the appropriate sulfinyl chloride with a compound $R'_3P=ZH$ in the presence of an acid acceptor inert to RSOCl.

FIELD OF THE INVENTION

This invention relates to new sulfinyl carbon-phosphorus and nitrogen-phosphorus ylids.

SUMMARY OF THE INVENTION

The present invention comprises novel compounds having the formula $$R-\overset{O}{\underset{|}{S}}-Z=PR'_3 \quad (I)$$

wherein Z is N or CX, X being an electron withdrawing group such as —CN, —COOR', —COR", —CONR"$_2$, —OR, —PO($C_6H_5$)$_2$, —$C_6H_4NO_2$, —$C_6H_4SO_2C_6H_5$, —$C_6H_5$ or the like.

In the above formulae:

R is a hydrocarbyl group of 1–18 carbon atoms free of ethylenic or acetylenic unsaturation or such hydrocarbyl group having heterocyclic oxygen, lower alkoxy or halogen substituents.

R' is a hydrocarbyl group of 1–18 carbon atoms free of ethylenic or acetylenic unsaturation or such hydrocarbyl group having lower alkoxy substituents.

R" is H or R.

In the above "lower" denotes that the alkyl group contains from 1 to 6 carbon atoms including straight chain and branched alkyl groups. The term halogen includes fluorine, chlorine, bromine and iodine.

The above compounds of Formula I can be made by reaction, in solution in an inert organic solvent, of a sulfinyl chloride having the formula $$R-\overset{O}{\underset{|}{S}}-Cl \quad (II)$$

with a compound having the formula $$R'_3P=ZH \quad (III)$$

at a temperature of −25° C. to 75° C., preferably from 0 to 25° C., in the presence of an acid acceptor, and recovering a compound having Formula I.

DETAILED DESCRIPTION OF THE INVENTION

The compounds of the present invention can be made by contacting and reacting a compound having the formula $R'_3P=ZH$ with a sulfinyl chloride R—SOCl in the presence of an acid acceptor. In the case in which Z is nitrogen, the compounds $R'_3P=ZH$ are themselves suitable acid acceptors and no further base is needed. When Z is a carbon atom activated by an electron withdrawing group X, an additional acid acceptor is required. Such acid acceptor must be inert to the reactants and the products. Suitable acid acceptors are tertiary amines including heterocyclic tertiary amines such as trialkylamines, pyridine, quinoline and the like.

The reaction is preferably conducted in an inert solvent for the reactants. Suitable solvents include aromatic and aliphatic hydrocarbons or such hydrocarbons substituted with halogen, or alkoxy groups; ethers, ketones and esters. Tertiary amines, which act as acid acceptors are also useful as solvents for the reaction.

The process is operable at temperatures of −25° C. to +75° C., but for convenience and good yields it is generally preferred to conduct the reaction at 0 to 25° C. The reaction can be suitably run at about 0° C. by cooling the vessel containing the reactants in an ice bath.

Pressure is not critical. Pressures below 1 atmosphere or pressures higher than 1 atmosphere can be employed.

In selecting solvents, acid acceptors and the condition of the reaction, it is preferred that the reaction mixture should not boil, i.e., if low pressures are used, a high boiling solvent is selected, which does not boil at the selected temperature and pressure.

The proportions of reactants can vary widely thus the ratio of ZH=PR'$_3$ to RSOCl can be from 20:1 to 1:10, although these limits are not critical. It is preferred to employ stoichiometric proportions, i.e., a ratio of about ZH=PR'$_3$/RSOCl of 2:1 when Z is N and 1:1 when Z is CX, for economy in the use of the reactants.

The new compositions are generally crystalline solids which have the capacity to absorb two equivalents of acid per mole. They are, therefore, useful as acid scavengers in aqueous or organic fluid systems. The compounds of the present invention are also useful as thermal stabilizers for polymers such as polyvinyl chloride which release acid on degradation.

This invention is further illustrated by the following examples, which should not, however be construed as fully delineating the scope of this discovery.

EXAMPLE 1

(Carbomethoxy-p-toluenesulfinylmethylene) triphenylphosphorane

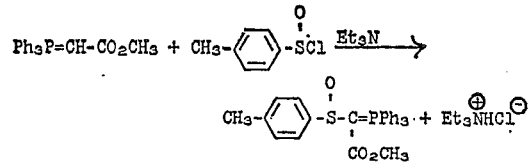

A solution of 7.58 g. (0.023 mole) of (carbomethoxymethylene)triphenylphosphorane and 3.2 ml. (2.3 g., 0.023 mole) of triethylamine in 200 ml. of anhydrous benzene was stirred at 0° C. while 3.96 g. (0.023 mole) of p-toluene sulfinyl chloride in 25 ml. of benzene was added during 0.5–1.0 hour. A precipitate of triethylamine hydrochloride separated immediately. The mixture was stirred for 3 hours and allowed to warm gradually to 25° C. during the last hour. The amine salt was collected, washed with fresh benzene, and dried in vacuo. The yield was 3.05 g. (96.5%). The filtrate was evaporated under vacuum to give a pale straw-colored syrup which crystallized on addition of 15–20 ml. of ethyl acetate and gentle warming. On filtration, there was obtained 8.75 g. (80.5%) of (carbomethoxy-p-toluenesulfinylmethylene) triphenylphosphorane in the form of white crystals, M.P. 142–144° C. dec. A second crop (1.08 g.) was obtained on evaporation of the filtrate and trituration of the residue with ethyl acetate. The total yield was 9.83 g. (90.5%).

Recrystallization of a small sample from ethyl acetate gave colorless microprisms, M.P. 145–147° C. dec.

*Analysis.*—Calcd. for $C_{28}H_{25}O_3PS$ (percent): C, 71.2; H, 5.34; S, 6.79. Found (percent): C, 71.2; H, 5.42; S, 6.73.

EXAMPLE 2

(Benzenesulfinylcarbomethoxymethylene) triphenylphosphorane

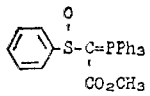

Using the procedure of Example 1, the reaction of (carbomethoxymethylene)triphenylphosphorane (16.72 g., 0.05 mole), triethylamine (7 ml., 0.05 mole) and benzenesulfinyl chloride (8.0 g., 0.05 mole) in 400 ml. of benzene was carried out. There was obtained 22 g. (96% yield) of (benzenesulfinylcarbomethoxymethylene)triphenylphosphorane, M.P. 120–121° C. dec. A sample twice-crystallized from ethyl acetate had M.P. 120–121° C. dec. and retained solvent of crystallization despite prolonged drying in vacuo.

*Analysis.*—Calcd. for $C_{27}H_{23}O_3PS \cdot \frac{1}{2}(CH_3CO_2C_2H_5)$ (percent): C, 69.3; H, 5.42; S, 6.38. Found (percent): C, 69.4; H, 5.46; S, 6.42.

EXAMPLE 3

(Cyano-p-toluenesulfinylmethylene) triphenylphosphorane

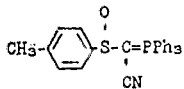

Using the procedure of Example 1, the reaction of (cyanomethylene)triphenylphosphorane (7.08 g.; 0.0235 mole), triethylamine (3.3 ml., 0.0235 mole) and p-toluenesulfinyl chloride (4.1 g., 0.0235 mole) in a mixture of 200 ml. of benzene and 75 ml. of dichloromethane was carried out. There was obtained 9.69 g. (94% yield) of (cyano - p - toluenesulfinylmethylene)triphenylphosphorane in the form of colorless crystals, M.P. 157–157.5° C. dec.

*Analysis.*—Calcd. for $C_{28}H_{22}NOPS$ (percent): C, 73.8; H, 5.05; S, 7.30. Found (percent): C, 73.5; H, 4.97; S, 7.35.

EXAMPLE 4

(Benzenesulfinylcyanomethylene)triphenylphosphorane

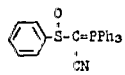

Using the procedure of Example 1, the reaction of (cyanomethylene)triphenylphosphorane (15.0 g., 0.05 mole) triethylamine (7 ml., 0.05 mole) and benzenesulfinyl chloride (8.0 g., 0.05 mole) in a mixture of 400 ml. of benzene and 75 ml. of dichloromethane was carried out. There was obtained 21.2 g. (97% yield) of (benzenesulfinylcyanomethylene)triphenylphosphorane in the form of colorless crystals, M.P. 213–214° C. dec.

*Analysis.*—Calcd. for $C_{26}H_{20}NOPS$ (percent): C, 73.4; H, 4.74; S, 7.54. Found (percent): C, 73.5; H, 4.82; S, 7.40.

EXAMPLE 5

N-benzenesulfinyltriphenylphosphinimine

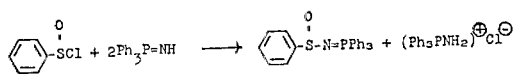

A solution of 18 mmoles of triphenylphosphinimine in 100 ml. of anhydrous benzene was chilled in ice and stirred while 1.4 g. (8.7 mmoles) of benzenesulfinyl chloride in 10 ml. of benzene was added during 0.5 hour. After an additional hour, the precipitated aminotriphenylphosphonium chloride was collected, washed with benzene, and dried. The yield was 2.73 g. (95.5% yield). The filtrate was evaporated to dryness, and the crystalline residue was washed with hexane. There was obtained 2.9 g. (83% yield) of N-benzenesulfinyltriphenylphosphinimine in the form of light tan crystals. Recrystallization from ethyl acetate gave large colorless prisms, M.P. 157–158° C. The melt showed only slight decomposition at 250–260° C. The mass spectrum showed low intensity peaks at m./3 123 (PhS≡N) and 278 (Ph₃P—O).

*Analysis.*—Calcd. for $C_{24}H_{20}NOPS$ (percent): C, 71.8; H, 5.02; N, 3.49; S, 7.99. Found (percent): C, 71.9; H, 4.79; N, 3.46; S, 8.12.

EXAMPLE 6

N-p-toluenesulfinyltriphenylphosphinimine

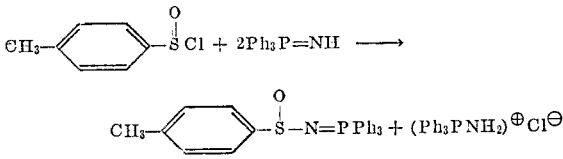

A solution of triphenylphosphinimine was prepared from 7.20 g. (0.023 mole) of the aminophosphonium salt in 175 ml. of anhydrous benzene and 14.4 ml. of ca. 1.6 M n-butyllithium in hexane. The imine solution was transferred by filtration into a second vessel and chilled in an ice bath while 2.0 g. (0.0115 mole) of p-toluenesulfinyl chloride in 10 ml. of benzene was added during 15–20 minutes. The mixture was allowed to stir and warm gradually to 25° C. over a period of 3 hours. The work-up was carried out as in Example 5, and from the filtrate there was obtained 4.25 g. (89% yield) of N-p-toluenesulfinyltriphenylphosphinimine in the form of the pale yellow crystals, M.P. 112–116° C. A sample crystallized from ethyl acetate had M.P. 118–119° C., and like the benzenesulfinyl derivative, showed surprising thermal stability at 250° C. and higher.

*Analysis.*—Calcd. for $C_{25}H_{22}NOPS$ (percent): C, 72.2; H, 5.34; S, 7.72. Found (percent): C, 72.0; H, 5.33; S, 7.66.

When the substituted phosphines shown in Column A of Table I are converted to the corresponding phosphinimines by the procedure of Appel & Hauss, Chem. Ber. 93, 405–11 (1960), and the resulting phosphinimines are substituted for triphenylphosphinimine in the procedure of Example 5, the ylids shown in Column B are obtained.

TABLE I

| | A | B |
|---|---|---|
| Item | Phosphine | Ylid product |
| 1 | Tri-1-naphthylphosphine | N-benzenesulfinyltri-1-naphthylphosphinimine. |
| 2 | Dimethyl-2,5-xylylphosphine | N-benzenesulfinyldimethyl-2,5-xylylphosphinimine. |
| 3 | Tributylphosphine | N-benzenesulfinyltributylphosphinimine. |
| 4 | Tri-m-tolylphosphine | N-benzenesulfinyltri-m-tolylphosphinimine. |
| 5 | Benzylbutylphenylphosphine | N-benzenesulfinylbenzylbutylphenylphosphinimine. |
| 6 | Tri-9-anthrylphosphine | N-benzenesulfinyltri-9-anthrylphosphinimine. |
| 7 | Tricyclohexylphosphine | N-benzenesulfinyltricyclohexylphosphinimine. |
| 8 | Tricyclopentylphosphine | N-benzenesulfinyltricyclopentylphosphinimine. |
| 9 | Tri-9-phenanthrylphosphine | N-benzenesulfinyltri-9-phenanthrylphosphinimine. |
| 10 | Hexadecyldiphenylphosphine | N-benzenesulfinylhexadecyldiphenylphosphinimine. |
| 11 | Triphenethylphosphine | N-benzenesulfinyltriphenethylphosphinimine. |

When the sulfinyl chlorides shown in Column A of Table II are substituted for p-toluenesulfinyl chloride in the procedure of Example I, the ylids shown in Column B are obtained. The sulfinyl chlorides in items 9 to 11 are prepared from the corresponding sulfonic acids by the procedure of Kurzer, "Organic Syntheses," Collective vol. IV, pp. 937–939.

TABLE II

| Item | A<br>Sulfinyl chloride | B<br>Methylenetriphenylphosphorane product |
|---|---|---|
| 1 | o-Toluenesulfinyl chloride | (Carbomethoxy-o-toluenesulfinylmethylene)triphenylphosphorane. |
| 2 | Methanesulfinyl chloride | (Carbomethoxymethanesulfinylmethylene)triphenylphosphorane. |
| 3 | Pentanesulfinyl chloride | (Carbomethoxypentanesulfinylmethylene)triphenylphosphorane. |
| 4 | 2-naphthalenesulfinyl chloride | (Carbomethoxy-2-napthalenesulfinylmethylene)triphenylphosphorane. |
| 5 | p-Methoxybenzenesulfinyl chloride | (Carbomethoxy-p-methoxybenzene-sulfinylmethylene)triphenyl-phosphorane. |
| 6 | p-Chlorobenzenesulfinyl chloride | (Carbomethoxy-p-chlorobenzene-sulfinylmethylene)triphenylphosphorane. |
| 7 | p-Bromobenzenesulfinyl chloride | (Carbomethoxy-p-bromobenzene-sulfinylmethylene)triphenylphosphorane. |
| 8 | p-Iodobenzenesulfinyl chloride | (Carbomethoxy-p-iodobenzenesulfinylmethylene)triphenylphosphorane. |
| 9 | Cyclohexanesulfinyl chloride | (Carbomethoxycyclohexanesulfinylmethylene)triphenylphosphorane. |
| 10 | Octadecanesulfinyl chloride | (Carbomethoxyoctadecanesulfinylmethylene)triphenylphosphorane. |
| 11 | 2-benzofuransulfinyl chloride | (Carbomethoxy-2-benzofuransulfinylmethylene)triphenylphosphorane. |

When the substituted phosphoranes shown in Column A of Table III are substituted for (cyanomethylene)triphenylphosphorane in the procedure of Example IV, the ylids shown in column B are obtained.

TABLE III

| Item | A<br>Substituted phosphorane | B<br>Sulfinylmethylenephosphorane product |
|---|---|---|
| 1 | (Carbomethoxymethylene)-tricyclohexylphosphorane. | (Benzenesulfinylcarbomethoxymethylene)tricyclohexylphosphorane. |
| 2 | (N,N-diphenylcarbamoylmethylene)triphenylphosphorane. | (Benzenesulfinyl-N,N-diphenylcarbamoylmethylene)triphenylphosphorane. |
| 3 | (Carboethoxymethylene)-trimethylphosphorane. | (Benzenesulfinylcarboethoxymethylene)trimethylphosphorane. |
| 4 | (Carboethoxymethylene)-trihexylphosphorane. | (Benzenesulfinylcarboethoxymethylene)trihexylphosphorane. |
| 5 | (Carboethoxymethylene)-tridecylphosphorane. | (Benzenesulfinylcarboethoxymethylene)tridecylphosphorane. |
| 6 | (Carboethoxymethylene)-tri-p-anisylphosphorane. | (Benzenesulfinylcarboethoxymethylene)tri-p-anisylphosphorane. |
| 7 | (Formylmethylene)triphenylphosphorane. | (Benzenesulfinylformylmethylene)triphenylphosphorane. |
| 8 | (Acetylmethylene)triphenylphosphorane. | (Benzenesulfinylacetylmethylene)-triphenylphosphorane. |
| 9 | (Chloroacetylmethylene)-triphenylphosphorane. | (Benzenesulfinylchloroacetylmethylene)triphenylphosphorane. |
| 10 | (Benzoylmethylene)triphenylphosphorane. | (Benzenesulfinylbenzoylmethylene)triphenylphosphorane. |
| 11 | (Methoxymethylene)triphenylphosphorane. | (Benzenesulfinylmethoxymethylene)triphenylphosphorane. |
| 12 | (Butoxymethylene)triphenylphosphorane. | (Benzenesulfinylbutoxymethylene)triphenylphosphorane. |
| 13 | (p-Tolyloxymethylene)-triphenylphosphorane. | (Benzenesulfinyl-p-tolyloxymethylene)triphenylphosphorane. |
| 14 | (Diphenylphosphinoxymethylene)triphenylphosphorane. | (Benzenesulfinyldiphenylphosphinoxymethylene)triphenylphosphorane. |
| 15 | (p-Nitrophenylmethylene)triphenylphosphorane. | (Benzenesulfinyl-p-nitrophenylmethylene)triphenylphosphorane. |
| 16 | (p-[Phenylsulfonyl]-phenylmethylene)triphenylphosphorane. | (Benzenesulfinyl-p-[phenylsulfonyl]phenylmethylene)triphenylphosphorane. |
| 17 | (Phenylmethylene)triphenylphosphorane. | (Benzenesulfinylphenylmethylene)triphenylphosphorane. |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound having the formula

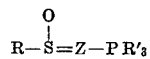

in which

Z is N or CX, X being an electron withdrawing group selected from the class consisting of —CN, —COOR', —COR$_2$', —CONR"$_2$, —OR, —PO(C$_6$H$_5$)$_2$ —C$_6$H$_4$NO$_2$, —C$_6$H$_4$SO$_2$C$_6$H$_5$, and C$_6$H$_5$ and:

R is a hydrocarbyl group of 1 to 18 carbon atoms free of ethylenic or acetylenic unsaturation or such hydrocarbyl group having heterocyclic oxygen, lower alkoxy or halogen substituents R' is a hydrocarbyl group free of ethylenic or acetylenic or acetylenic unsaturation or such hydrocarbyl group having lower alkoxy substituents R" is H or R.

2. Composition of claim 1 in which
R is p-methylphenyl
R' is phenyl
and Z is C—CO$_2$CH$_3$.

3. Composition of claim 1 in which
R is p-methylphenyl
R' is phenyl
and Z is C—CN.

4. Composition of claim 1 in which
R is phenyl
R' is phenyl
and Z is C—CO$_2$CH$_3$.

5. Composition of claim 1 in which
R is phenyl
R' is phenyl
and Z is C—CN.

6. Composition of claim 1 in which
R is phenyl
R' is phenyl
and Z is N.

7. Composition of claim 1 in which
R is p-methylphenyl
R' is phenyl
and Z is N.

References Cited

UNITED STATES PATENTS 3,253,028    5/1966    Louthan _____ 260—551

HENRY R. JILES, Primary Examiner

H. I. MOATZ, Assistant Examiner

U.S. Cl. X.R.

252—189; 260—45.8 A, 45.85, 45.9, 347.2, 470, 551 P, 551 S, 557 R, 558 S, 559 T, 561 S, 562 S, 590, 593 R, 594, 599, 601 R, 606.5 P, 932

PO-1050
(5/69)

UNITED STATES PATENT OFFICE
CERTIFICATE OF CORRECTION

Patent No. 3,647,856          Dated March 7, 1972

Inventor(s)      Alden Dwayne Josey

It is certified that error appears in the above-identified patent and that said Letters Patent are hereby corrected as shown below:

Col. 3, line 45, change "$C_{28}$" to -- $C_{27}$ --;

Col. 6, line 20, "$-COR_2'$ " should be changed to

-- $-COR''$ -- .

Signed and sealed this 8th day of August 1972.

(SEAL)
Attest:

EDWARD M. FLETCHER, JR.      ROBERT GOTTSCHALK
Attesting Officer              Commissioner of Patents